United States Patent
Yasuda (10) Patent No.: US 8,687,108 B2
(45) Date of Patent: Apr. 1, 2014

(54) IMAGE PICKUP APPARATUS THAT MAKES MOVEMENT OF FOCUS LENS INCONSPICUOUS, AND CONTROL METHOD FOR THE IMAGE PICKUP APPARATUS

(71) Applicant: Canon Kabushiki Kaisha, Tokyo (JP)

(72) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/826,761

(22) Filed: Mar. 14, 2013

(65) Prior Publication Data

US 2013/0201387 A1 Aug. 8, 2013

Related U.S. Application Data

(62) Division of application No. 12/969,763, filed on Dec. 16, 2010, now Pat. No. 8,564,713.

(30) Foreign Application Priority Data

Dec. 22, 2009 (JP) .................................. 2009-291181
Nov. 19, 2010 (JP) .................................. 2010-258489

(51) Int. Cl.
  *H04N 5/232* (2006.01)
  *G03B 3/00* (2006.01)

(52) U.S. Cl.
  USPC .............................................. 348/351; 396/89

(58) Field of Classification Search
  USPC ............ 348/345, 348–351, 353–356; 396/89
  See application file for complete search history.

(56) References Cited

U.S. PATENT DOCUMENTS

| | | | | |
|---|---|---|---|---|
| 4,924,317 A | * | 5/1990 | Hirao et al. | 348/351 |
| 5,402,175 A | * | 3/1995 | Tanaka | 348/351 |
| 5,912,774 A | * | 6/1999 | Yoshida et al. | 359/823 |
| 6,337,714 B1 | * | 1/2002 | Lee et al. | 348/345 |
| 7,057,646 B2 | * | 6/2006 | Yasuda | 348/208.99 |
| 2001/0048479 A1 | * | 12/2001 | Ohkawara et al. | 348/360 |
| 2011/0149141 A1 | * | 6/2011 | Yasuda | 348/345 |

* cited by examiner

*Primary Examiner* — Timothy J Henn (74) *Attorney, Agent, or Firm* — Cowan, Liebowitz & Lawman, P.C.

(57) ABSTRACT

An image pickup apparatus includes a detector configured to detect an in-focus direction based on a focus signal that results from an output signal of an image pickup device by reciprocating a focus lens in an optical axis direction, and a focus controller configured to provide focusing by moving the focus lens in the in-focus direction. The focus controller is configured to set an amplitude of the focus lens when moving a center of a reciprocation of the focus lens, to be less than that of the focus lens when the center of the reciprocation of the focus lens is not moved.

8 Claims, 5 Drawing Sheets

IMAGE PICKUP APPARATUS THAT MAKES MOVEMENT OF FOCUS LENS INCONSPICUOUS, AND CONTROL METHOD FOR THE IMAGE PICKUP APPARATUS

CROSS-REFERENCE TO RELATED APPLICATIONS

This application is a divisional of application Ser. No. 12/969,763, filed Dec. 16, 2010 the entire disclosure of which is hereby incorporated by reference.

BACKGROUND OF THE INVENTION

1. Field of the Invention

The present invention relates to focusing (control method) in an image pickup apparatus, such as a digital camera and a digital video camera.

2. Description of the Related Art

Autofocusing based on the sharpness (AF evaluation value) of an image obtained by processing an output signal from an image pickup device in an image pickup apparatus is known, and will be described as "TV-AF" hereinafter. In this TV-AF, the wobbling is used to find an in-focus direction and then mountain climbing is performed in the in-focus direction. In the wobbling, the focus lens is micro-reciprocated in the optical-axis direction at a predetermined period and the center of the reciprocation of the focus lens is moved in a direction in which the AF evaluation value increases (Japanese Patent Laid-Open No. 2005-121819).

However, along with the recent miniaturization of the image pickup device, when a motor having a limited stopping resolution, such as a stepping motor, is used for wobbling, a movement of the focus lens problematically appears on an image.

SUMMARY OF THE INVENTION

The present invention provides an image pickup apparatus and its control method, which can make inconspicuous a movement of a focus lens.

An image pickup apparatus according to one aspect of the present invention includes a detector configured to detect an in-focus direction based on a focus signal that results from an output signal of an image pickup device by reciprocating a focus lens in an optical axis direction, and a focus controller configured to provide focusing by moving the focus lens in the in-focus direction. The focus controller is configured to set an amplitude of the focus lens when moving a center of a reciprocation of the focus lens, to be less than that of the focus lens when the center of the reciprocation of the focus lens is not moved.

Further features of the present invention will become apparent from the following description of exemplary embodiments with reference to the attached drawings.

DESCRIPTION OF THE EMBODIMENTS

Figure 1:
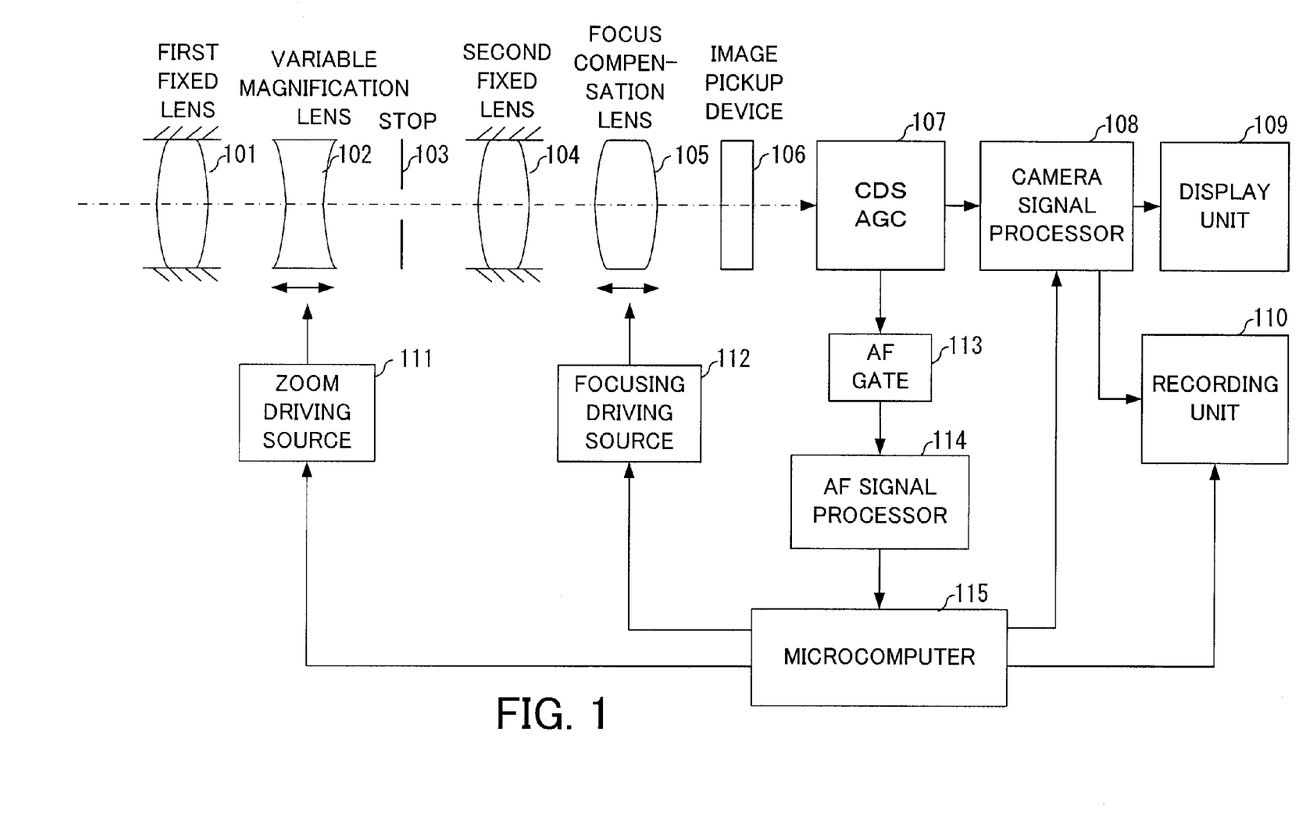
FIG. 1 is a block diagram of a video camera according to one embodiment.

FIG. 1 is a block diagram of a digital video camera (image pickup apparatus) of this embodiment. The video camera of this embodiment is an image pickup lens integrated type, but the image pickup lens may be exchangeable. In this case, a control signal generated by a microcomputer 115, which will be described later, is sent to a lens computer in the image pickup lens so as to control driving of a focus lens via the lens computer. In addition, this embodiment is applicable to a variety of image pickup apparatuses, such as a digital still camera.

In FIG. 1, reference numeral 101 denotes a first fixed lens, and reference numeral 102 denotes a variable magnification lens configured to move in the optical axis direction and to vary the magnification. Reference numeral 103 denotes a stop, and reference numeral 104 denotes a second fixed lens. Reference numeral 105 denotes a focus lens that has both a focusing function and a so-called compensator function configured to correct an image plane movement as the magnification varies. The first fixed lens 101, the variable magnification lens 102, the stop 103, the second fixed lens 104, and the focus lens 105 constitute an image pickup optical system.

Reference numeral 106 denotes an image pickup device as a photoelectric conversion element, such as a CCD sensor and a CMOS sensor, configured to provide a photoelectric conversion of an optical image (or an object image) formed on an image pickup plane into an electric signal. Reference numeral 107 denotes a CDS/AGC circuit configured to sample an output of the image pickup device 106, and to provide a gain adjustment.

Reference numeral 108 denotes a camera signal processor configured to provide a variety of image processes for the output signal from the CDS/AGC circuit 107 and to generate a video signal. Reference numeral 109 denotes a display unit, such as an LCD, configured to display a video signal from the camera signal processor 108. Reference numeral 110 denotes a recording unit configured to record an image signal from the camera signal processor 108 in a recording medium, such as a semiconductor memory.

Reference numeral 111 denotes a zoom driving source configured to move the variable magnification lens 102. Reference numeral 112 denotes a focusing driving source configured to move the focus lens 105. Each of the zoom driving source 111 and the focusing driving source 112 includes a stepping motor.

The stepping motor has a limited stopping resolution. This embodiment makes inconspicuous fine driving in a small depth of focus, when the driver having such a limited stopping resolution is used.

Reference numeral 113 denotes an AF gate configured to allow a passage of a signal of a focus detection area among output signals from all pixels from the CDS/AGC circuit 107.

The AF signal processor 114 is configured to generate an AF evaluation value (which is a focus signal representative of an in-focus state of the focus lens 105) by extracting a high-frequency component or a brightness difference component (which is a difference between a maximum value and a minimum value of a brightness level of a signal that has passed the AF gate 113) from the signal that has passed the AF gate 113, and to send it to the microcomputer 115. The AF signal processor 114 serves as a detector configured to detect an in-focus direction based on a focus signal that results from an image signal obtained from the image pickup device 106 by reciprocating the focus lens 105 in the optical axis direction.

As described above, the AF evaluation value represents the sharpness (or referred to as a "contrast value") of an image obtained by processing an output signal from the image pickup device 106, and is a focus signal used to evaluate the in-focus state of the image pickup optical system since the sharpness varies according to the in-focus state of the image pickup optical system.

The microcomputer ("MC") 115 serves as a controller, which controls operations of the whole video camera, controls the focusing driving source 112, and provides the TV-AF used to move the focus lens 105. Therefore, the MC 115 serves as a focus controller configured to provide focusing by moving the focus lens 105 in the in-focus direction.

Figure 2:
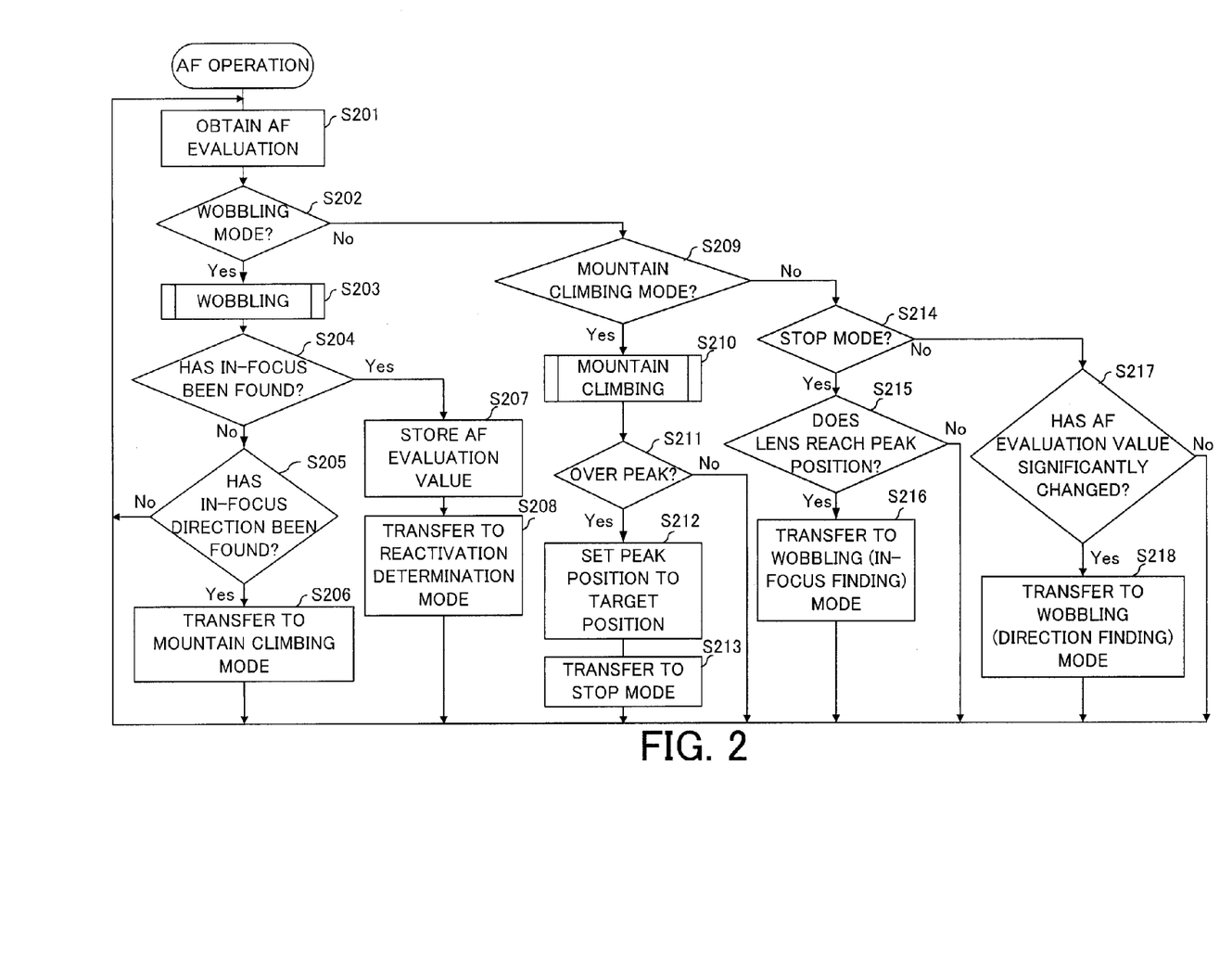
FIG. 2 is a flowchart for explaining an AF action of a microcomputer illustrated in FIG. 1.

FIG. 2 is a flowchart illustrating the TV-AF operation of the MC 115, and "S" denotes an abbreviation of the step in FIG. 2 and subsequent figures.

Initially, the MC 115 takes in the AF evaluation value via the AF signal processor 114 (S201). Next, the MC 115 determines whether or not the current mode is a wobbling mode (S202), and if so wobbles or reciprocates the focus lens 105 with a small amplitude that cannot be recognized on the screen (S203).

The wobbling is performed so as to detect the in-focus direction that is a direction from the current position to the in-focus position on the optical axis of the focus lens 105. In the TV-AF, the MC 115 controls the focusing driving source 112 configured to drive the focus lens 105 so as to provide autofocus on the in-focus position corresponding to the peak of the AF evaluation value.

Next, the MC 115 determines whether or not the in-focus has been found (S204). When determining that the in-focus has not been found (No of S204), the MC 115 determines whether or not the in-focus direction has been found (S205).

When determining that the in-focus direction has not been found (No of S205), the flow returns to S201. On the other hand, when determining that the in-focus direction has been found (Yes of S205), the MC 115 transfers the process to the mountain climbing mode (S206) and returns the flow to S201.

On the other hand, when determining the in-focus could be determined (Yes of S204), the MC 115 stores the AF evaluation value corresponding to the in-focus position (S207), transfers the process to the reactivation mode (S208) that determines whether the wobbling (direction finding) is again repeated (S217, S218), and returns the flow to S201.

On the other hand, when determining that the current mode is not a wobbling mode (No of S202), the MC 115 determines whether or not the current mode is the mountain climbing mode (S209) and if so performs mountain climbing (S210). In S210, similar to FIGS. 6-7 of JP 2005-121819, the MC 115 moves the focus lens 105 in accordance with the mountain climbing method at the predetermined velocity in a direction in which the AF evaluation value increases.

Next, the MC 115 determines whether or not the focus lens 105 has crossed a peak of the AF evaluation value (S211), and if not (No of S211) returns the flow to S201.

On the other hand, when determining that the focus lens 105 has crossed the peak of the AF evaluation value (Yes of S211), the MC 115 sets the in-focus position corresponding to the peak of the AF evaluation value to a target position of the focus lens 105 (S212), transfers the process to the stop mode (S213), and returns the flow to S201.

On the other hand, when determining that the current mode is not the mountain climbing mode (No of S209), the MC 115 determines whether or not the current mode is the stop mode (S214) and if so determines whether or not the focus lens 105 has reached the peak position of the AF evaluation value (S215).

When determining that the focus lens 105 has reached the peak position (Yes of S215), the MC 115 transfers the process to the wobbling (in-focus finding) mode (S216) and returns the flow to S201. On the other hand, when determining that the focus lens 105 has not yet reached the peak position (No of S215), the MC 115 returns the flow to S201.

On the other hand, when determining that the current mode is not the stop mode (No of S214), the MC 115 compares the AF evaluation value stored in S207 with the current AF evaluation value and determines whether or not the current AF evaluation value changed by a threshold or larger (S217).

When determining that the AF evaluation value has not yet changed by the threshold or larger (No of S217), the flow returns to S201. On the other hand, when determining that the AF evaluation value has changed (Yes of S217), the MC 115 transfers the process to the wobbling (direction finding) mode (S218).

Figure 3:
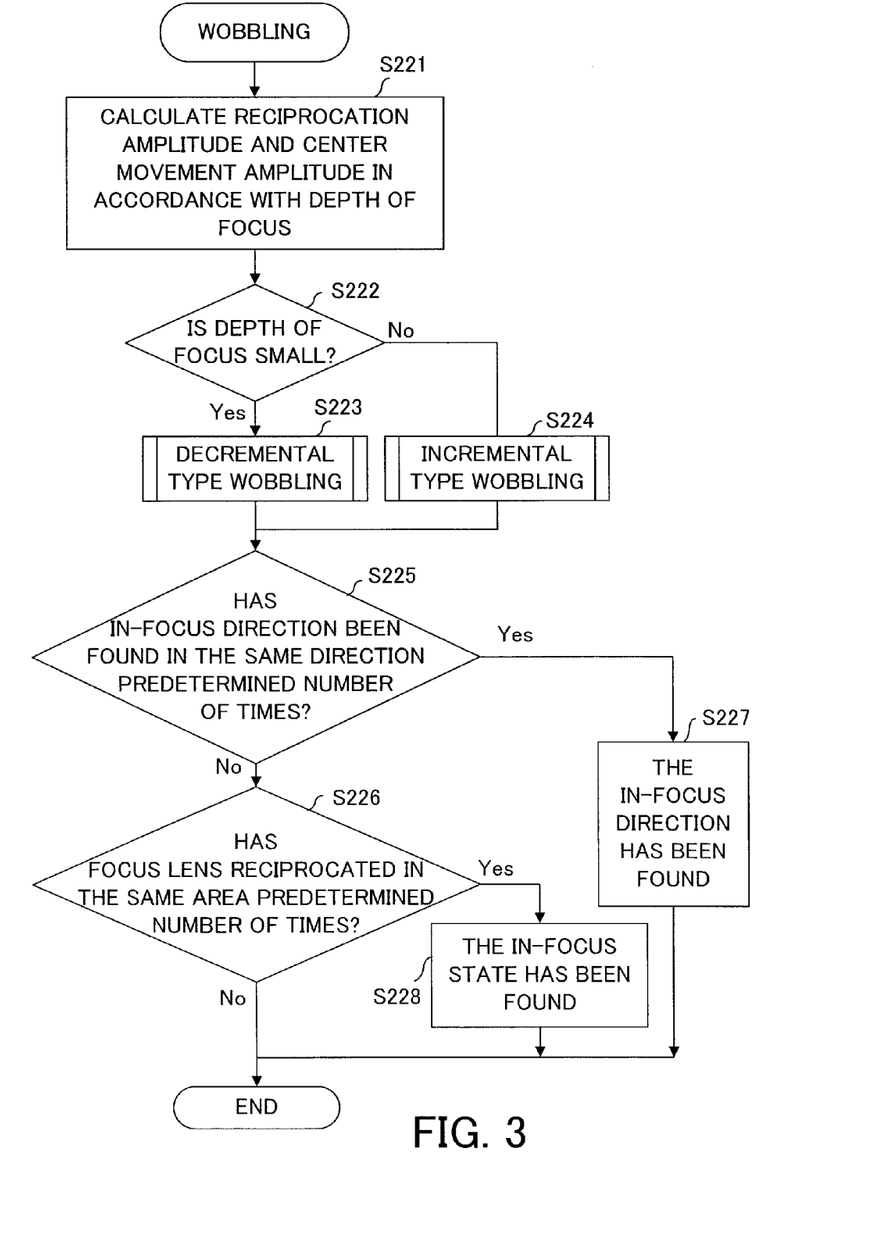
FIG. 3 is a detailed flowchart of S203 illustrated in FIG. 2.

FIG. 3 is a detailed flowchart of the wobbling in S203. In the wobbling, the focus lens 105 is micro-oscillated in the optical axis direction and the in-focus direction is detected based on the AF evaluation value at that time and the center of the reciprocation is moved toward the detected in-focus direction simultaneous with the reciprocation.

Initially, the MC 115 calculates the reciprocation amplitude and the (reciprocation) center movement amplitude in accordance with the depth of focus determined by the stop 103, the zoom position, etc. (S221).

Next, the MC 115 determines whether or not the depth of focus is small (or less than a threshold) (S222), if so performs a decremental type wobbling (S223), and if not performs an incremental type wobbling (S224). This embodiment utilizes a motor having a limited position resolution, and provides such an AF control that wobbling can be hidden in the small depth of focus, and that the responsiveness can be maintained in the large depth of focus.

After S223 or S224, the MC 115 determines whether or not the in-focus direction has been found continuously in the same direction a predetermined number of times (S225), and if not the MC 115 determines whether or not the focus lens 105 has reciprocated in the same area a predetermined number of times (S226).

When determining that the focus lens 105 has not reciprocated in the same area a predetermined number of times (No of S226), the MC 115 terminates the process and the flow transfers to S204. On the other hand, when determining that the focus lens 105 has reciprocated in the same area a predetermined number of times (Yes of S226), the MC 115 terminates the process and the flow transfers to S204 because the in-focus has been found (S228).

On the other hand, when determining that the in-focus direction has been found continuously in the same direction a predetermined number of times (Yes of S225), the MC 115 terminates the process and the flow transfers to S204 since the in-focus direction has been found (S227).

Figure 4:
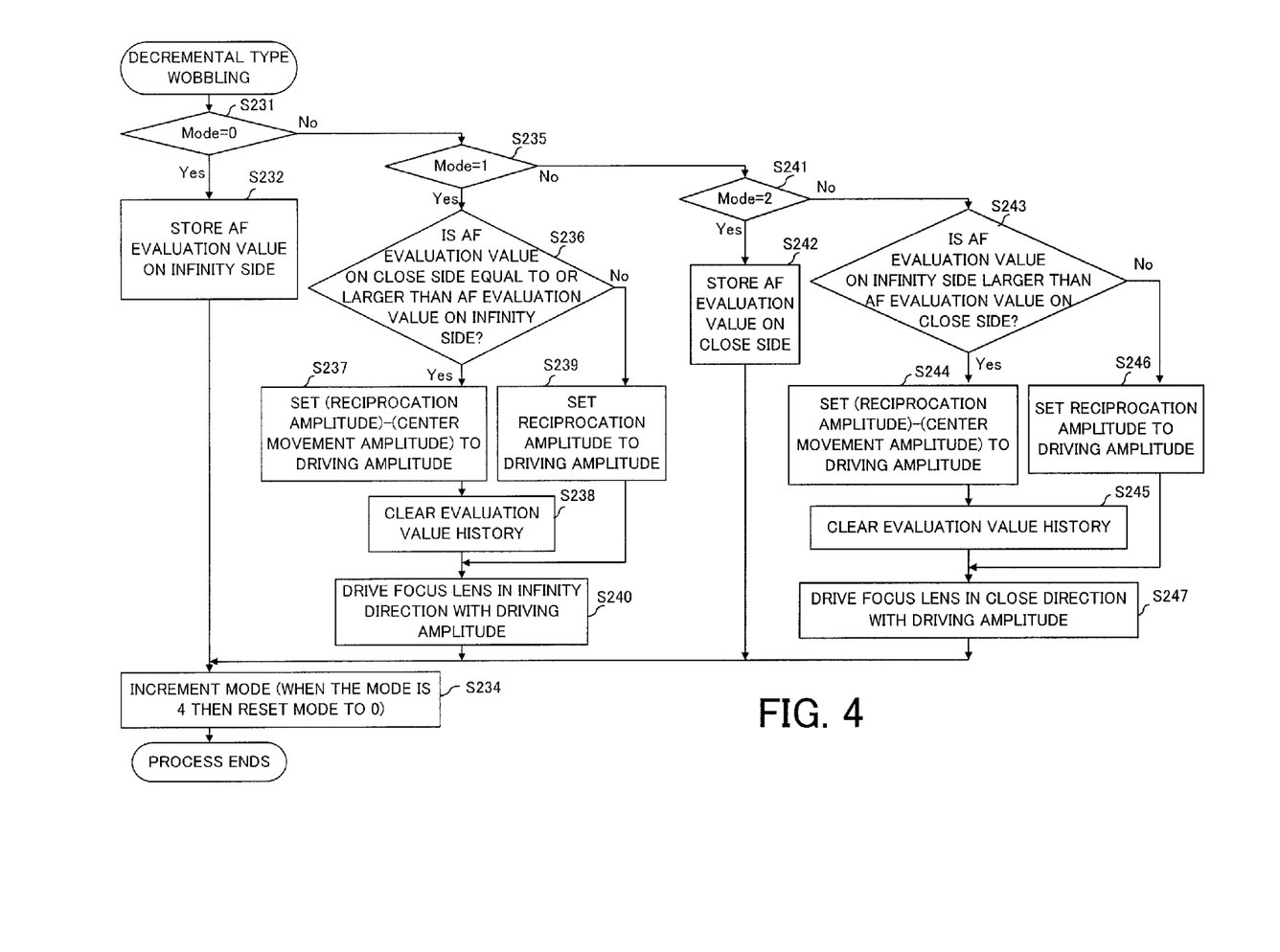
FIG. 4 is a detailed flowchart of S223 illustrated in FIG. 3.

FIG. 4 is a detailed flowchart of S223, or the operational flow of the wobbling when the depth of focus is less than the threshold.

Initially, the MC 115 determines whether or not the current mode representative of the operational state of the wobbling is 0 (S231). When the current mode (number) is 0 (Yes of S231), the MC 115 provides a process that stops the focus lens 105 on the close side.

Initially, the MC 115 stores, as an AF evaluation value of the infinity side, the AF evaluation value calculated based on the image signal generated from electronic charges stored in the image pickup device 106 when the focus lens 105 is located on the infinity side (S232). Next, the MC 115 increments the mode, resets the mode to 0 when it becomes four or larger (S234), and terminates the process.

On the other hand, when determining that the current mode is not 0 (No of S231), then the MC 115 determines whether or not the current mode is 1 (S235). When the current mode is 1 (Yes of S235), the MC 115 performs a process that moves the focus lens 105 in the infinity direction.

On the premise, the MC 115 sets the reciprocation amplitude and the center movement amplitude used to drive the focus lens 105 in S240. Usually, these amplitudes are set within the depth of focus.

Initially, the MC 115 determines whether or not the previously obtained and stored AF evaluation value on the close side is equal to or larger than the previously obtained and stored AF evaluation value on the infinity side (S236).

When determining that the AF evaluation value on the close side is equal or larger (Yes of S236), the MC 115 sets the driving amplitude as an (reciprocation amplitude)—a (center movement amplitude) (S237). The MC 115 moves the reciprocation center to the close direction by reducing a driving amount in the infinity direction. The wobbling can be made inconspicuous or unrecognizable in the small depth of focus by limiting the driving amplitude of the wobbling.

Thereafter, the MC 115 clears the history of the AF evaluation value (S238), and determines a direction of the next center movement based on the AF evaluation value obtained after the center is moved.

On the other hand, when determining that the AF evaluation value on the infinity side is larger (No of S236), the MC 115 sets the reciprocation amplitude to the driving amplitude (S239).

Next, the MC 115 drives the focus lens 105 with the driving amplitude determined by the S237 or S238 in the infinity direction (S240), and transfers the flow to S234.

On the other hand, when determining that the current mode is not 1 (No of S235), the MC 115 determines whether the current mode is 2 (S241). When the current mode is 2 (Yes of S241), the MC 115 provides a process that stops the focus lens 105 on the infinity side.

Initially, the MC 115 stores, as the AF evaluation value on the close side, the AF evaluation value calculated based on the image signal generated from electric charges stored in the image pickup device 106 when the focus lens 105 is located on the close side (S242). Next, the MC 115 increments the mode, resets it to 0 when its becomes equal to or larger than 4 (S234), and terminates the process.

On the other hand, when determining that the current mode is 3 rather than 2 (No of S241), the MC 115 provides a process to drive the focus lens 105 in the close direction.

Initially, the MC 115 determines whether or not the previously obtained and stored AF evaluation value on the infinity side is larger than the previously obtained and stored AF evaluation value on the close side (S243).

When determining that the AF evaluation value on the infinity side is larger (Yes of S243), the MC 115 sets the driving amplitude as an (reciprocation amplitude)—a (center movement amplitude) (S244). The MC 115 moves the reciprocation center in the infinity direction by reducing a driving amount in the close direction. The MC 115 can make the wobbling inconspicuous or unrecognizable in the small depth of focus by limiting the driving amplitude of the wobbling.

Thereafter, the MC 115 clears the history of the AF evaluation value (S245), and determines a direction of the next center movement based on the AF evaluation value obtained after the center is moved.

On the other hand, when determining that the AF evaluation value on the infinity side is equal to or smaller than the AF evaluation value on the close side (No of S243), the MC 115 sets the driving amplitude as the reciprocation amplitude (S239).

Next, the MC 115 moves the focus lens 105 in the close direction with the amplitude determined by S244 or S246 (S247), and transfers the flow to S234.

This embodiment reduces the driving amplitude of the focus lens 105 in the wobbling when the depth of focus is less than a threshold, as illustrated in S237 and S244. In other words, the driving amplitude of the focus lens 105 in moving the reciprocation center (or in S237 or S244) is less than the driving amplitude of the focus lens 105 when the reciprocation center is maintained (or is not moved) (as in S239 or S246). In addition, the maximum amplitude of the focus lens 105 is the driving amplitude of the focus lens 105 when the reciprocation center is maintained (or is not moved) (as in S239 or S246). On the other hand, JP 2005-121819 sets a sum of the reciprocation amplitude and the center movement amplitude to the driving amplitude of the focus lens in moving the reciprocation center, and is similar to this embodiment as to the driving amplitude of the focus lens in maintaining the reciprocation center. This embodiment can thus make a movement of the focus lens 105 inconspicuous in a small depth of focus.

This embodiment sets the amplitude of the focus lens 105 in moving the center of the reciprocation through control by the MC 115, to be less than that of the focus lens 105 in maintaining the center of the reciprocation. However, it is sufficient that the driving amplitude in moving the center of the reciprocation is less than the driving amplitude in maintaining the center of the reciprocation irrespective of the control of the focus lens 105.

Figure 5:
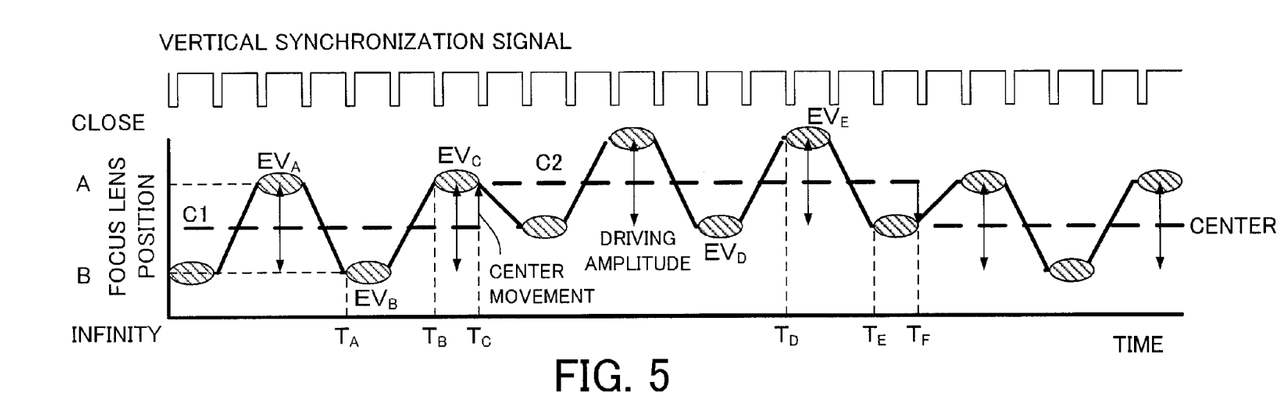
FIG. 5 is a graph for explaining an effect of FIG. 4.

FIG. 5 is a view illustrating a time elapse of the action of the focus lens 105 at this time. The abscissa axis denotes the time in which unit time is determined by the vertical synchronization signal of the image pickup device 106. The ordinate axis denotes the position of the focus lens 105.

In FIG. 5, an AF evaluation value $EV_A$ for electric charges (hatched eclipse) stored at a position A of the image pickup device 106 is taken in by the MC 115 at time $T_A$. An AF evaluation value $EV_B$ for electric charges (hatched eclipse) stored at a position B of the image pickup device 106 is taken in by the MC 115 at time $T_B$. An AF evaluation value $EV_C$ for electric charges (hatched eclipse) stored at a position C of the image pickup device 106 is taken in by the MC 115 at time $T_C$.

When determining that $EV_A<EV_A$ at the time $T_c$, the MC 115 provides a setting to move the reciprocation center C1, and if not provides a setting to maintain the reciprocation center C1. In FIG. 5, in driving the focus lens 105 in the infinity direction (S240), the reciprocation center C1 is moved to the reciprocation center C2 on the close side (S237). Thus, the MC 115 moves the reciprocation center of the focus lens 105 when a movement direction (infinity direction) in the reciprocation of the focus lens 105 becomes opposite to the movement direction (close direction) of the reciprocation center of the focus lens 105.

When determining that $EV_E<EV_D$ at time $T_F$, the MC 115 provides a setting to move the reciprocation center C2, and if not provides a setting to maintain the reciprocation center C2. In FIG. 5, the reciprocation center is moved to the infinity side (S244) in moving the focus lens 105 in the close direction (S247). Thus, the MC 115 moves the reciprocation center of the focus lens 105 when the movement direction (close direction) in the reciprocation of the focus lens 105 becomes opposite to the movement direction (infinity direction) of the reciprocation center of the focus lens 105.

In this case, the MC 115 does not detect an in-focus direction based on the AF evaluation value obtained with a pre-movement center of the reciprocation after the reciprocation center is moved. In other words, the MC 115 clears the history of the AF evaluation value (S238) after the reciprocation center C1 is moved, wobbles the focus lens 105 with a new (post-movement) reciprocation center C2, newly obtains the AF evaluation value, and determines the center movement.

This embodiment maintains the maximum amplitude within the reciprocation amplitude, and newly obtains the AF evaluation value for the center movement by wobbling the focus lens at that position. Therefore, this embodiment is characteristically less likely to excessively move the center of the reciprocation.

On the other hand, in the incremental type wobbling in S224, the MC 115 sets to the driving amplitude a sum of the reciprocation amplitude and the center movement amplitude in the step corresponding to S237 or S244 of FIG. 4 of this embodiment.

Figure 6:
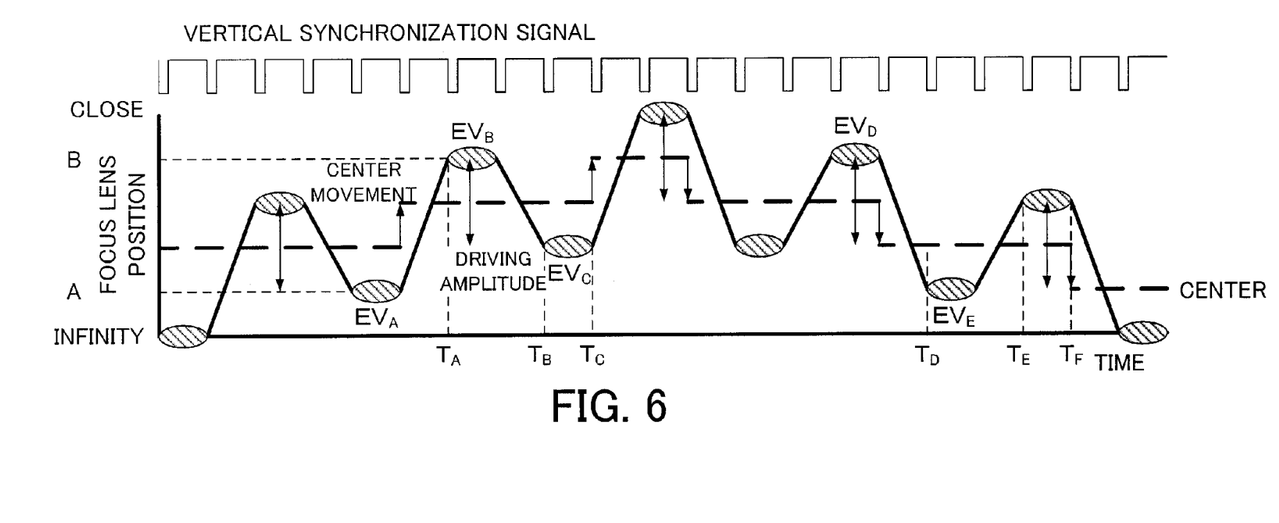
FIG. 6 is a graph for explaining an effect of S224 illustrated in FIG. 3.

FIG. 6 is a view illustrating the time elapse of the action of the focus lens 105 in the incremental type wobbling. The way of reading the graph is similar to that of FIG. 5. The MC 115 provides a setting to move the reciprocation center in the close direction at the time $T_C$ when $EV_E > EV_A$, and if not provides a setting to maintain the reciprocation center. In FIG. 6, the MC 115 moves the reciprocation center in the close direction in moving the focus lens 105 in the close direction. Thus, the MC 115 moves the reciprocation center of the focus lens 105 when the movement direction (close direction) in the reciprocation of the focus lens 105 becomes identical to the movement direction (close direction) of the reciprocation center of the focus lens 105.

When $EV_D < EV_E$, the MC 115 provides a setting to move the reciprocation center to the infinity side at the time $T_F$, and if not provides a setting to maintain the reciprocation center. In FIG. 6, in moving the focus lens 105 in the infinity direction, the MC 115 moves the reciprocation center in the infinity direction. Thus, the MC 115 moves the reciprocation center of the focus lens 105 when the movement direction (infinity direction) in the reciprocation of the focus lens 105 becomes identical to the movement direction (infinity direction) of the reciprocation center of the focus lens 105.

In FIG. 6, the maximum amplitude is a sum of the reciprocation amplitude and the center movement amplitude, and the center is continuously moved. Thus, quick focusing is available when the center is continuously moved in the same direction.

Thus, the MC 115 moves the focus lens 105 by repeating the reactivation determination, the wobbling, the mountain climbing, the stop, the wobbling, and the reactivation determination in this order, and the in-focus state is maintained so that the AF evaluation value can be maintained maximum.

This embodiment utilizes a wobbling method that moves the center of the reciprocation by reducing the amplitude when the depth of focus is small, and utilizes a wobbling method that moves the center of the reciprocation by increasing the amplitude when the depth of focus is large. Therefore, this embodiment can provide excellent AF performance with a motor having a limited positional resolution because the wobbling cannot be recognized in the small depth of focus, and the responsiveness is not impaired in the large depth of focus.

This embodiment compares the previously obtained and stored AF evaluation value on the infinity side with the previously obtained and stored AF evaluation value on the close side. However, for example, rather than comparing the AF evaluation value $EV_A$ with the AF evaluation value $EV_B$ in FIG. 5, the AF evaluation value $EV_A$ may be compared with an average of the AF evaluation value $EV_B$ and an AF evaluation value that is located on the left side of the AF evaluation value $EV_A$. Like the above average, a plurality of AF evaluation values may be selected as an object to be compared.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291181, filed on Dec. 22, 2009 and Japanese Patent Application No. 2010-258489, filed on Nov. 19, 2010, which are hereby incorporated by reference herein in their entirety.

What is claimed is:

1. An image pickup apparatus comprising:
   a signal generation unit configured to generate a focus signal from an output signal of an image pickup device; and
   a control unit configured to perform wobbling of the focus lens in an optical axis direction with predetermined amplitude,
   wherein the control unit determines a first direction that the focus signal increases and moves a center of the wobbling of the focus lens to the first direction by a first mode or a second mode,
   wherein the control unit moves the focus lens a first amount smaller than the predetermined amplitude in the first mode, and moves the focus lens a second amount larger than the predetermined amplitude in the second mode, and
   wherein the control unit sets the first mode or the second mode on the basis of a depth of focus.

2. The image pickup apparatus according to claim 1, further comprising a stepping motor configured to drive the focus lens.

3. The image pickup apparatus according to claim 1, wherein the control unit moves the center of the wobbling by the first mode when a depth of focus is smaller than a threshold.

4. The image pickup apparatus according to claim 3, wherein the control unit moves the center of the wobbling by the second mode when the depth of focus is not smaller than the threshold.

5. The image pickup apparatus according to claim 1, wherein the control unit moves the focus lens the first amount when a movement direction of the focus lens becomes opposite to the first direction in the first mode, and moves the focus lens the second amount when the movement direction of the focus lens becomes corresponding to the first direction in the second mode.

6. The image pickup apparatus according to claim 1, wherein the control unit determines the first direction on the basis of the focus signal generated by using charge accumulated by the image pickup device while the focus lens is stopped.

7. The image pickup apparatus according to claim 1, wherein the control unit determines the first direction on the basis of the focus signal generated after a pre-movement of the center of the wobbling.

8. A control method of an image pickup apparatus that includes an image pickup device, the control method comprising the steps of:
- generating a focus signal from an output signal of the image pickup device;
- performing wobbling of the focus lens in an optical axis direction with predetermined amplitude;
- determining a first direction that the focus signal increases; and
- moving a center of the wobbling of the focus lens to the first direction by a first mode or a second mode,
- wherein the moving step moves the focus lens a first amount smaller than the predetermined amplitude in the first mode, and moves the focus lens a second amount larger than the predetermined amplitude in the second mode, and
- wherein the first mode or the second mode is set on the basis of a depth of focus.

* * * * *